S. P. EVANS.
Gang Corn-Planter.

No. 160,889. Patented March 16, 1875.

Witnesses:  
Inventor:  
S. P. Evans

UNITED STATES PATENT OFFICE.

SILVANUS P. EVANS, OF ASH RIDGE, OHIO.

IMPROVEMENT IN GANG CORN-PLANTERS.

Specification forming part of Letters Patent No. 160,889, dated March 16, 1875; application filed May 18, 1874.

*To all whom it may concern:*

Be it known that I, SILVANUS P. EVANS, of Ash Ridge, in the county of Brown and State of Ohio, have invented a new and Improved Corn-Planter; and I do hereby declare that the following is a full, clear, and exact description of the same, reference being had to the accompanying drawing forming a part of this specification, in which—

Figure 1:
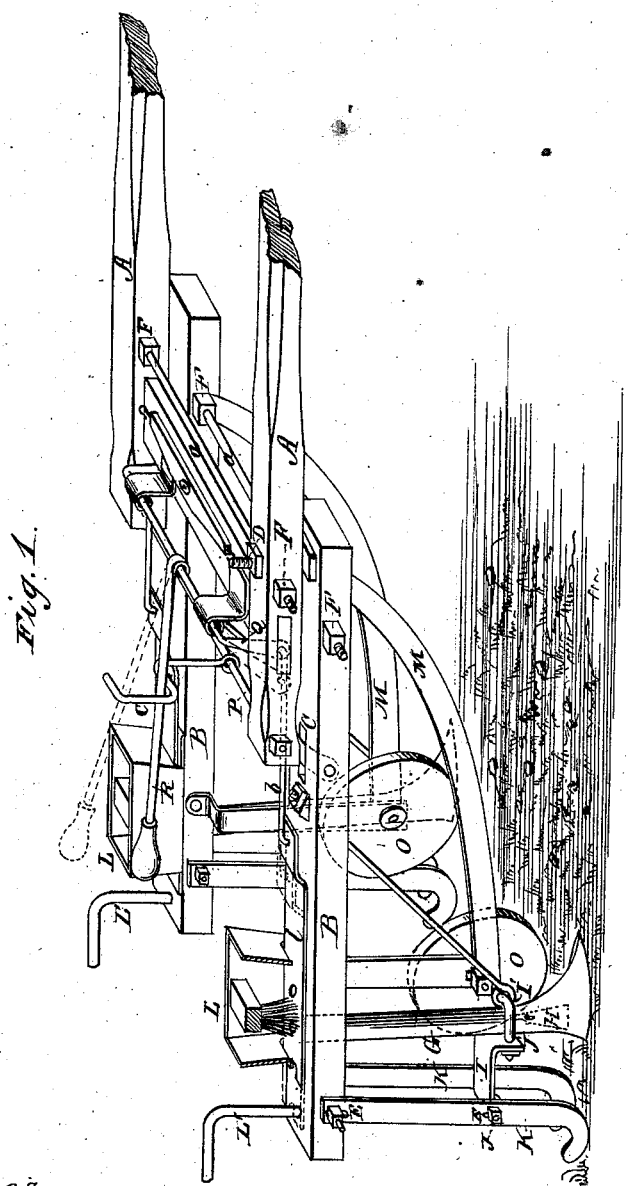
Figure 2:
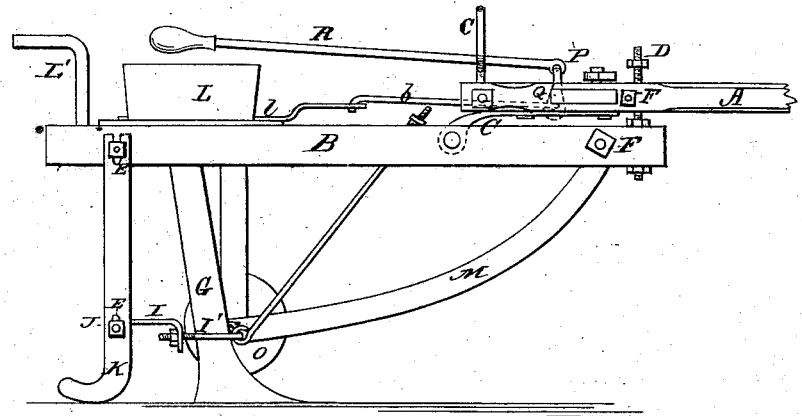

Figure 1 is a perspective view of my planter, with one of the hoppers and the shafts in section. Fig. 2 is a side elevation thereof.

My invention relates to an improvement in walking-planters; and consists in the means of adjustable connection between the seed-spouts and seed-covering devices, as hereinafter described.

I design employing a series of gang-planters. Each set of planting devices is attached to a beam, B, and the latter is slotted near its front end, to adapt it for pivotal attachment to the curved rigid arm C of a thill or shaft, A. Screws D pass vertically through the thills A and serve to adjust the angle of beams B thereto. This arrangement and the adaptation of the wheels O for vertical adjustment enable the depth of the furrows to be varied at will. The thills A and also the beams B are connected by cross-rods $a$, having screw-nuts F and collars $a'$. Thus they can be adjusted laterally, at will, to increase or diminish the space between them, according to the width it is desired the furrows shall be apart. A seed-hopper, L, is applied to the upper side of each beam B and slotted at its ends to allow the seed-slide to be reciprocated through it by means of rods $b$, the lever R, and crank-rod P, which latter connects two or more slides. When the slides are not being reciprocated the lever R is supported upon a bent arm, $c$, as shown. The hopper has the usual brush cut-off, and the slide has two perforations to receive the seed and discharge it into the seed-spouts or tubes G G. The latter have broad shares or feet, which operate as furrow-openers. A conical device, H, is pivoted in the lower end of each seed-tube G, to spread the seed as it descends, and thus insure the seeds or kernels being planted separate from each other in the furrow. A pair of vertical bars, K, are arranged in rear of each seed-tube G, and curved at their lower ends to adapt them to cover the seed by pushing a portion of the loosened earth back into the furrow.

The feature of my invention is the connection made between the bars K and tubes G by a plate, I, and clevis I', both of which may be adjusted vertically by means of clamp or screw nuts, as shown. This adjustment is necessary whenever the curved feet of bars K require to be set higher or lower, to cause them to cover the seed to a greater or less depth; and it may also be desirable when the thills are adjusted relative to the beams.

The bars K are held in any adjustment by means of bolts and nuts. Each beam B is provided with a handle, L', and supported by a wheel, O, which is pivoted to the angle of a curved brace, M.

I design in some cases to substitute a tongue or pole for the shafts A.

I do not claim, broadly, an adjustable connection between seed-covering plates and seed-spouts of a planter; but

I claim—

In a corn-planter, the slotted bars K, plate I, and vertically-adjustable clevis I', in combination with the seed-spouts G, as shown and described.

S. P. EVANS. [L. S.]

Witnesses:
WM. H. MINNIX,
BEN. M. PLUMB.